(12) United States Patent
Smart et al.

(10) Patent No.: US 6,711,355 B1
(45) Date of Patent: Mar. 23, 2004

(54) CAMERA HAVING ROTARY OPTICAL ENCODER

(75) Inventors: David C. Smart, Fairport, NY (US); Craig A. Baker, Marion, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/269,321

(22) Filed: Oct. 11, 2002

(51) Int. Cl.⁷ ................................................ G03B 17/24
(52) U.S. Cl. ...................... 396/316; 396/315; 396/317
(58) Field of Search .................................. 396/310–317

(56) References Cited

U.S. PATENT DOCUMENTS

| 5,335,003 A | * | 8/1994 | Sugden | ....................... 347/224 |
| 5,587,752 A | | 12/1996 | Petruchik | |
| 5,740,479 A | | 4/1998 | Soma et al. | |
| 5,761,558 A | | 6/1998 | Patton et al. | |
| 6,332,059 B1 | | 12/2001 | Kamata et al. | |
| 6,374,057 B1 | * | 4/2002 | Hayakawa | ................... 396/315 |

* cited by examiner

Primary Examiner—Russell Adams
Assistant Examiner—Michael Dalakis
(74) Attorney, Agent, or Firm—Robert Luke Walker

(57) ABSTRACT

A camera, used with photographic film, has a body having an exposure support surrounding an exposure opening. The body defines an encoder light path. An encoder is mounted in the body in alignment with the encoder light path. The encoder has an axis of rotation. The encoder has a marker occupying part of the encoder light path. The marker has a pair of subunits. The subunits are opposed relative to the axis of rotation. A drive is coupled to the encoder. The drive selectively rotates the encoder about the axis of rotation between a primary position and a plurality of secondary positions. The subunits are both disposed in the encoder light path in all of the positions.

24 Claims, 16 Drawing Sheets

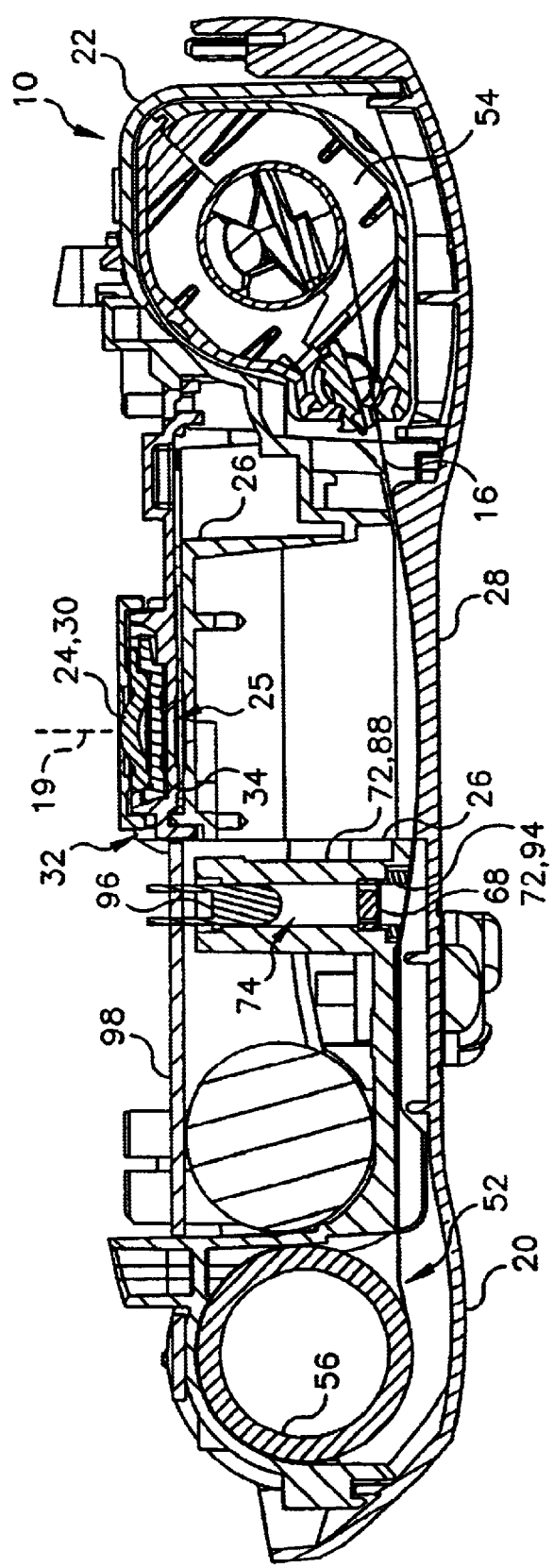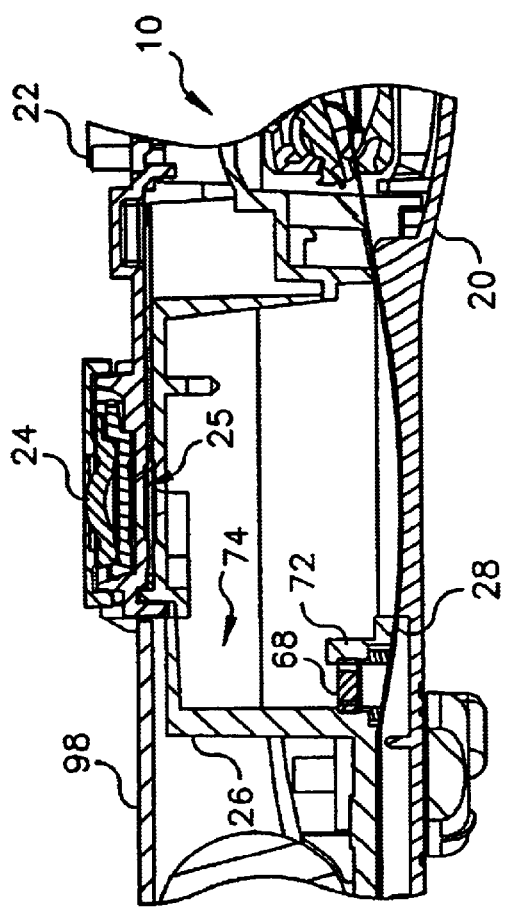
FIG. 3a
FIG. 3b

CAMERA HAVING ROTARY OPTICAL ENCODER

CROSS REFERENCE TO RELATED APPLICATIONS

Reference is made to commonly assigned, co-pending U.S. patent application Ser. No. 10/269,598, entitled: PHOTOGRAPHY SYSTEMS AND METHODS UTILIZING FILTER-ENCODED IMAGES, filed Oct. 11, 2002, in the names of Joel S. Lawther, Anthony DiRisio, David C. Smart, Edward B. Gindele; Ser. No. 10/269,715, entitled: CAMERAS, METHODS, AND SYSTEMS WITH PARTIAL-SHADING ENCODEMENTS, filed Oct. 11, 2002 in the names of David C. Smart, Anthony DiRisio, Joel S. Lawther, Robert Luke Walker, Edward B. Gindele, David A. Hodder; Ser. No. 10/269,322, entitled: CAMERA HAVING TRANSVERSE OPTICAL ENCODER, filed Oct. 11, 2002 in the name of David C. Smart; Ser. No. 10/269,622, entitled: METHODS, APPARATUS, AND SYSTEMS FOR DETECTING PARTIAL-SHADING ENCODEMENT FILTERING, filed Oct. 11, 2002 in the names of Edward B. Gindele, Joel S. Lawther, David C. Smart.

FIELD OF THE INVENTION

The invention relates to photography and photographic equipment and methods and more particularly relates to a camera having a rotary optical encoder.

BACKGROUND OF THE INVENTION

Optically recorded encodements on photographic filmstrips have long been used to control printing and other functions. U.S. Pat. No. 5,740,479 describes optical encodements and indicates that it is known to use reflected light from the photographic subject or a light directly from a camera light source to provide the illumination for recording the optical encodement. This patent also notes that the use of ambient lighting to write the encodement is subject to the shortcoming that the recorded information can be difficult to distinguish under some lighting conditions.

It is known to prerecord encodements on film before a one-time-use camera is assembled. It is also known to recorded encodements for selected image frames based upon a camera condition at the time of picture taking U.S. Pat. No. 6,332,059 combines both practices. A first encodement is prerecorded on the film before assembly and a second encodement is added to selected film frames based on the position of a selection switch. An encodement that applies to all of the images in a film unit can be recorded so as to apply to all frames, rather than being repeated. U.S. Pat. No. 5,761,558 discloses the recording of extensive information on the outside of a film unit in a visible bar code.

Encodements can be placed in various positions. U.S. Pat. No. 6,332,059 discloses placement of optical encodements at film margins adjoining film frames. U.S. Pat. No. 5,587,752 discloses placement of optical encodements laterally next to an image, either within or next to a respective film frame. Japanese patent publication JP 4-328537, published Nov. 17, 1992, discloses a one-time-use camera having a pair of slidable viewfinder masks that move in tandem with a pair of code signal plates for pseudo panoramic and pseudo telephoto final image formats. The code signal plates mask part of the exposure opening when a respective viewfinder mask is in position in the viewfinder. One of the code signal plates is illustrated as having one slot. The other is shown as having two slots. (image subject matter is visible through the slots.) The final images crop out the patterns made by the code signal plates.

It is well known to use optical encodements on filmstrips to provide photofinishing instructions. JP 54-26721 and discloses a camera having a rotating disk. The disk has three different patterns in different positions about a central axis. The patterns are one hole, two holes, and three holes. The disk is rotated for a particular encodements and the light from a light source shines through to expose the encodement onto the film. The use of viewfinder encoders to show the effects of pseudo zoom are also disclosed.

It would thus be desirable to provide an improved way of encoding filmstrips in a camera, which is simple and provides for a relatively large number of encodements.

SUMMARY OF THE INVENTION

The invention is defined by the claims. The invention, in its broader aspects, provides a camera, used with photographic film, that has a body having an exposure support surrounding an exposure opening. The body defines an encoder light path. An encoder is mounted in the body in alignment with the encoder light path. The encoder has an axis of rotation. The encoder has a marker occupying part of the encoder light path. The marker has a pair of subunits. The subunits are opposed relative to the axis of rotation. A drive is coupled to the encoder. The drive selectively rotates the encoder about the axis of rotation between a primary position and a plurality of secondary positions. The subunits are both disposed in the encoder light path in all of the positions.

It is an advantageous effect of the invention that an improved camera and method are provided, in which an encoder is simple and provides for a relatively large number of encodements.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 3a is a longitudinal cross-sectional view of the camera of FIG. 1 taken substantially along line 3—3 of FIG. 1. For clarity, the front cover is not shown.

FIG. 3b is the same view as FIG. 3a of a modified camera.

FIG. 18b is a semi-diagrammatical view of a segment of filmstrip exposed using the camera of FIG. 18a.

DETAILED DESCRIPTION OF THE INVENTION

Figure 1:
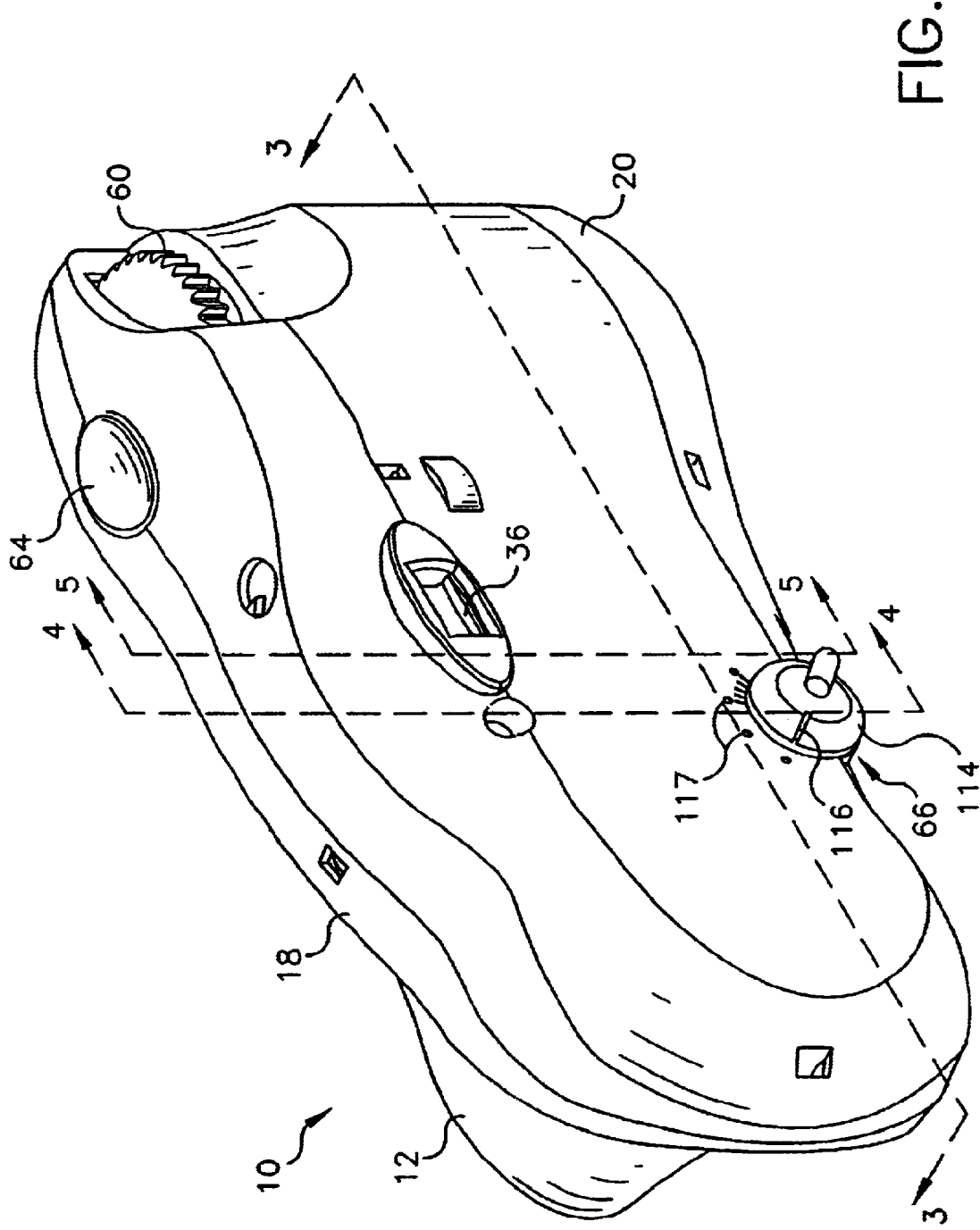
FIG. 1 is a rear perspective view of an embodiment of the camera.
Figure 2:
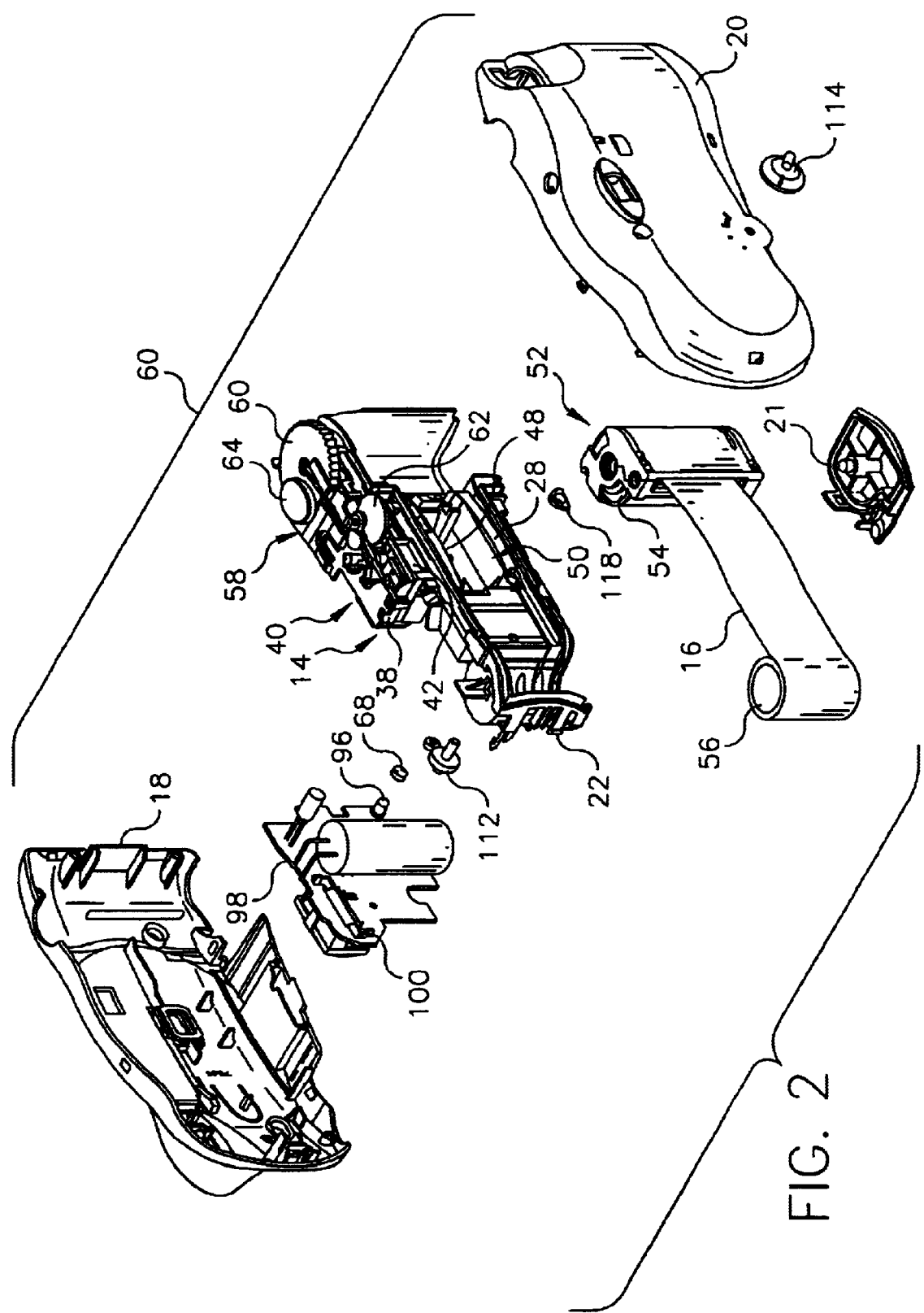
FIG. 2 is an exploded perspective view of the camera of FIG. 1.

The camera 10 has a body 12 that holds a capture unit 14, which captures light images on photographic film 16. The body 12 has a front cover 18 and a rear cover 20, a camera-fame 22 held between the covers 18,20, and a film door 21. Most camera 10 components are attached to the camera-frame 22 or trapped between the camera-frame 22 and covers 18,20.

The capture unit 14 has a taking lens 24 that defines an optical axis 19 and directs light through an aperture and then a baffle 26 to an exposure support 28. The taking lens 24 includes one or more lens elements 30. The capture unit 14 includes a shutter assembly 32 having a shutter 34 that momentarily opens to take a picture. A viewfinder 36 is disposed in the body 12 and is registered with the taking lens 24 so as to show substantially the same scene image. The viewfinder 36 has a tunnel 38 that is part of the camera-frame 22 and front and rear viewfinder lenses 40,42.

The exposure support 28 is rectangular and holds a frame 44 of film 16 and an interspace 46 (the short film segment between adjacent film frames 44). The exposure support 28 has an edge 48 that surrounds a rectangular exposure opening 50.

A filmstrip 16 of a film unit 52 is held in the exposure support 28. The filmstrip 16 is advanced through the exposure support 28 on a frame-by-frame basis for each image capture. The camera 10 can be reusable or one-time-use. In the one-time-use camera 10 shown, the filmstrip 16 is prewound out of a film canister 54 into a film roll 56 during camera 10 assembly. The filmstrip 16 is advanced by a film transport 58, which includes a film advance 60, such as a thumbwheel, that is operated by the user. The film transport 58 incorporates a rotating counterwheel 62 that has indicia (not illustrated) to indicate film 16 usage. The shutter 34 is charged by the film transport 58. A shutter release 64 is tripped by the user to release the shutter 34 for image exposure.

The term "one-time use camera" and like terms are used herein to refer to cameras that are provided to consumers in preloaded form and cannot be reloaded, by the consumer, without extensive camera disassembly, or replacement of parts, or use of special tools, or the like.

The camera 10 includes an encoder unit 66 having an encoder 68 and an encoder drive 70. The encoder 68 is located in a passageway 72 that extends through the camera-frame 22 at the exposure support 28. The passageway 72 transmits light along all or part of an encoder light path 74 from a light source to the film 16 at the exposure support 28. The encoder 68 divides the passageway 72 into two zones that differ in light transmission. When light is transmitted along the encoder light path 74, the difference in transmission of the two zones produces an encodement pattern 76 on the film 16. The encoder 68 is rotatable, within the passageway 72 about an axis of rotation 78 to change the encodement pattern 76.

The encoder can have an inscribed periphery that is inset from the passageway in one or more places; such that, in one of the zones of the passageway, light is intercepted by this encoder and in the other zone, light passes around the encoder. This approach has the shortcoming that the size, and possibly shape, of the zone of greater light transmission is a function of the size and shape of two parts, one of which rotates relative to the other.

Figure 5:
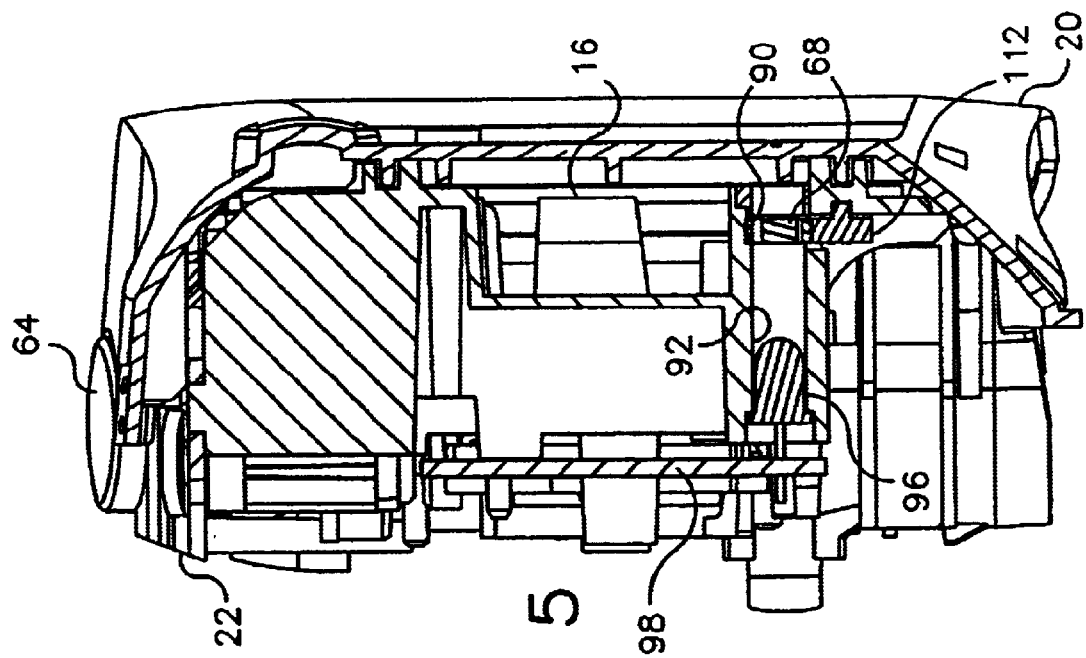
FIG. 5 is a transverse cross-sectional view of the camera of FIG. 1 taken substantially along line 5—5 of FIG. 1.
Figure 4:
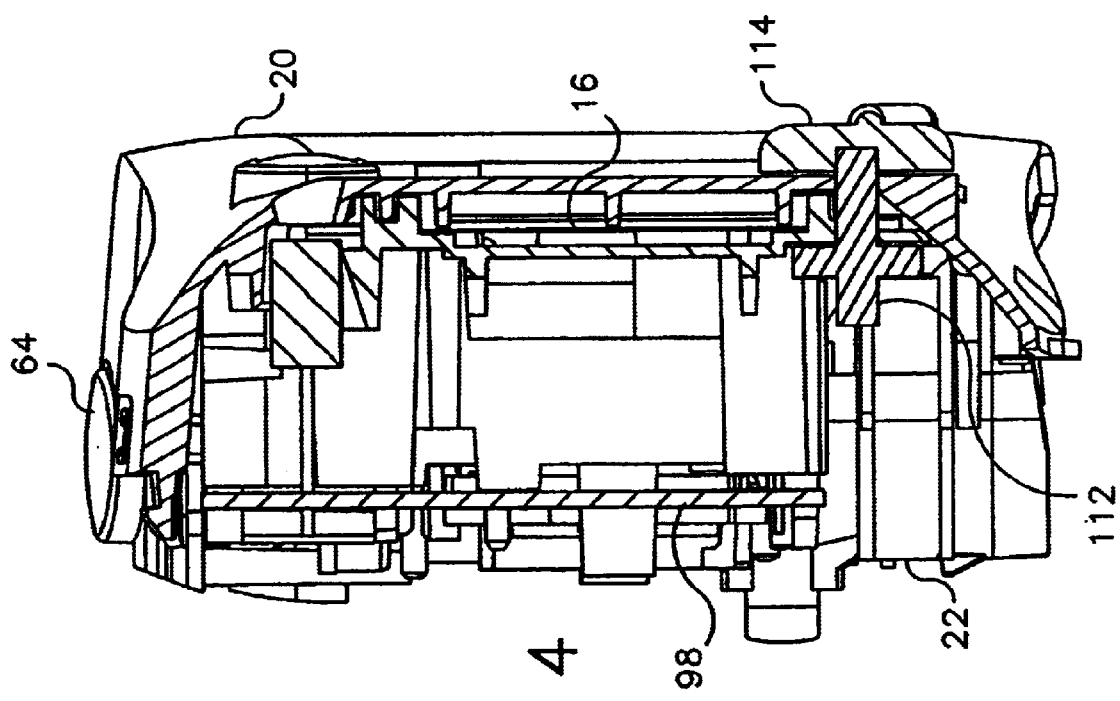
FIG. 4 is a transverse cross-sectional view of the camera of FIG. 1 taken substantially along line 4—4 of FIG. 1.

It is preferred, that the boundary 82 between the two zones of different light transmission is defined solely by the encoder 68. In this case, the encoder 68 has a marker 84 and a field 86 that differ in light transmission. The marker 84 is inset within the field 86. Light is blocked from passing around the periphery 80 of the encoder 68. In the illustrated embodiments, the camera-frame 22 has a tubular wall 88 that is enlarged in diameter in a rear section 90 (indicated in FIG. 5), relative to a front section 92. The encoder 68 has a disk-shaped outline and is seated in the rear section 90 against (overlapping) the shoulder of the front section 92. The encoder 68 is held in place by a hollow insert 94 that is press-fit or otherwise immobilized in the rear section 90, rearward from the encoder 68. The passageway 72 includes the tubular wall 88 and the insert 94.

In the camera shown in FIG. 3a, the light source is a lamp 96 and the passageway 72 extends continuously from the lamp 96 to the exposure support 28. The end of the passageway 72 at the lamp 96 is held light-tight by a seal surrounding the lamp 96 or by other light locking features. A convenient lamp 96 is a light emitting diode (LED). Illumination of the light emitting diode or other lamp 96 occurs with each exposure. Circuits that provide this function are very well known to those of skill in the art. In a simple case, the LED or other lamp 96 can be provided as part of the flash unit 98 of the camera 10 and the flash unit 98 and lamp 96 are fired with every exposure. As a further simplification, the lamp 96 can be replaced by a light pipe (not illustrated) conducting light from the strobe tube 100 of the flash unit 98.

A lamp 96 circuit that is independent of the flash unit 98 can be operated by synchronization contacts like those used for flash units. Such synchronization contacts are well known to those of skill in the art. The light-on duration of the lamp 96 can be the same for each exposure and can be determined by a timer circuit or can be provided as a clock function of a camera microprocessor or other computing device.

In an alternative embodiment, shown in FIG. 3b, scene lighting is used in place of a lamp 96 and the encoder light path 74 is provided within the baffle 26. In this case, the light source is a portion of the light entering through the taking lens 24 at image capture. The encoder 68 can be freely positioned or can be disposed in a short passageway 72 extending from the exposure support 28 through the baffle 26 to the light cone transmitted by the taking lens 24. The passageway 72 and encoder are otherwise as earlier described. This camera can be modified by extending the passage to the outside of the camera body and adding a dedicated shutter (not shown).

The encoder 68 is aligned with the exposure support 28 and is located either between the exposure support 28 and the taking lens 24 or between the exposure support 28 and the rear cover 20. In the latter case, light must be supplied by a lamp, light pipe, or other light source. The former position is currently preferred, as the filmstrip 16 is not equally transmissive on both sides and commonly available photographic films have an orange antihalation layer on the reverse side.

The alignment of the encoder 68 and a film plane defined by the exposure support 28 can be relatively exact, so that the filmstrip 16 and encoder 68 lie closely parallel. Alternatively, the encoder 68 can be slightly offset. In particular embodiments, the encoder 68 is parallel to the filmstrip 16 within in the exposure support 28, in one or two orthogonal directions. The former is the case if the filmstrip 16 is curved in one dimension to accommodate the shape of a simple, single element taking lens 24. In the other case, the filmstrip 16 is held flat within the exposure support 28 and the encoder 68 is located in a parallel plane.

When the user takes a picture, the light propagated along the passageway 72 exposes an encodement pattern 76 onto the film 16 in association with a respective film frame 44. (Unless specifically indicated otherwise, the camera is discussed herein in terms of embodiments, in which a single encodement pattern 76 is exposed for each film frame 44.) It is convenient if a particular encodement pattern 76 adjoins a respective film frame 44, rather than being offset by one or more film frames, since this permits filmstrips to be cut into shorter lengths without separation of film frames and respective encodement patterns.

Figure 11:
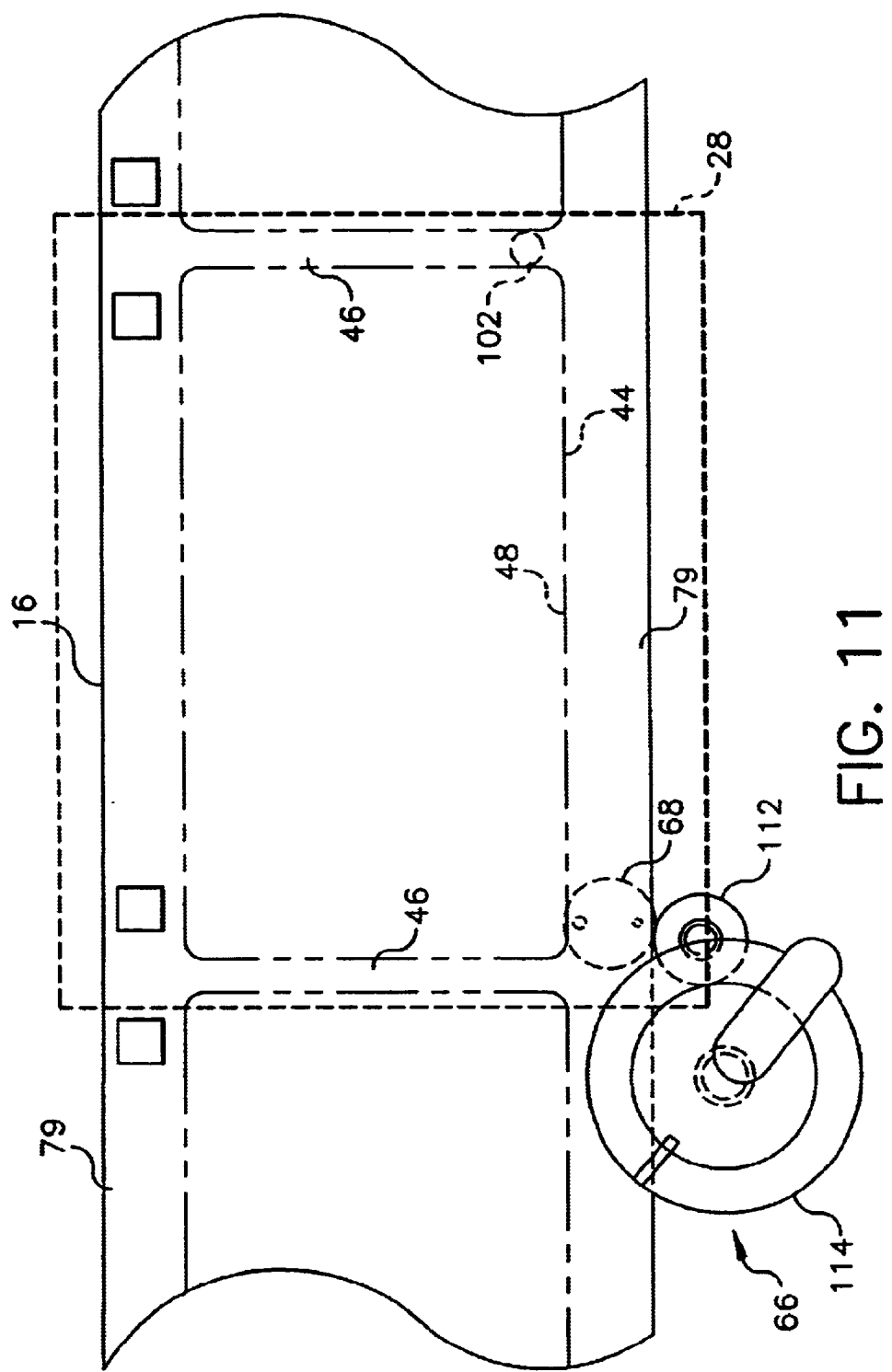
FIG. 11 is a semi-diagrammatical view of the encoder assembly of FIG. 4 in position over the exposure support of the camera. A section of the filmstrip (indicated in FIG. 8 by solid lines) is in position in the exposure support. The position of the exposure support is indicated by dashed lines. An alternative position and size encoder is indicated by dashed lines.
Figure 12:
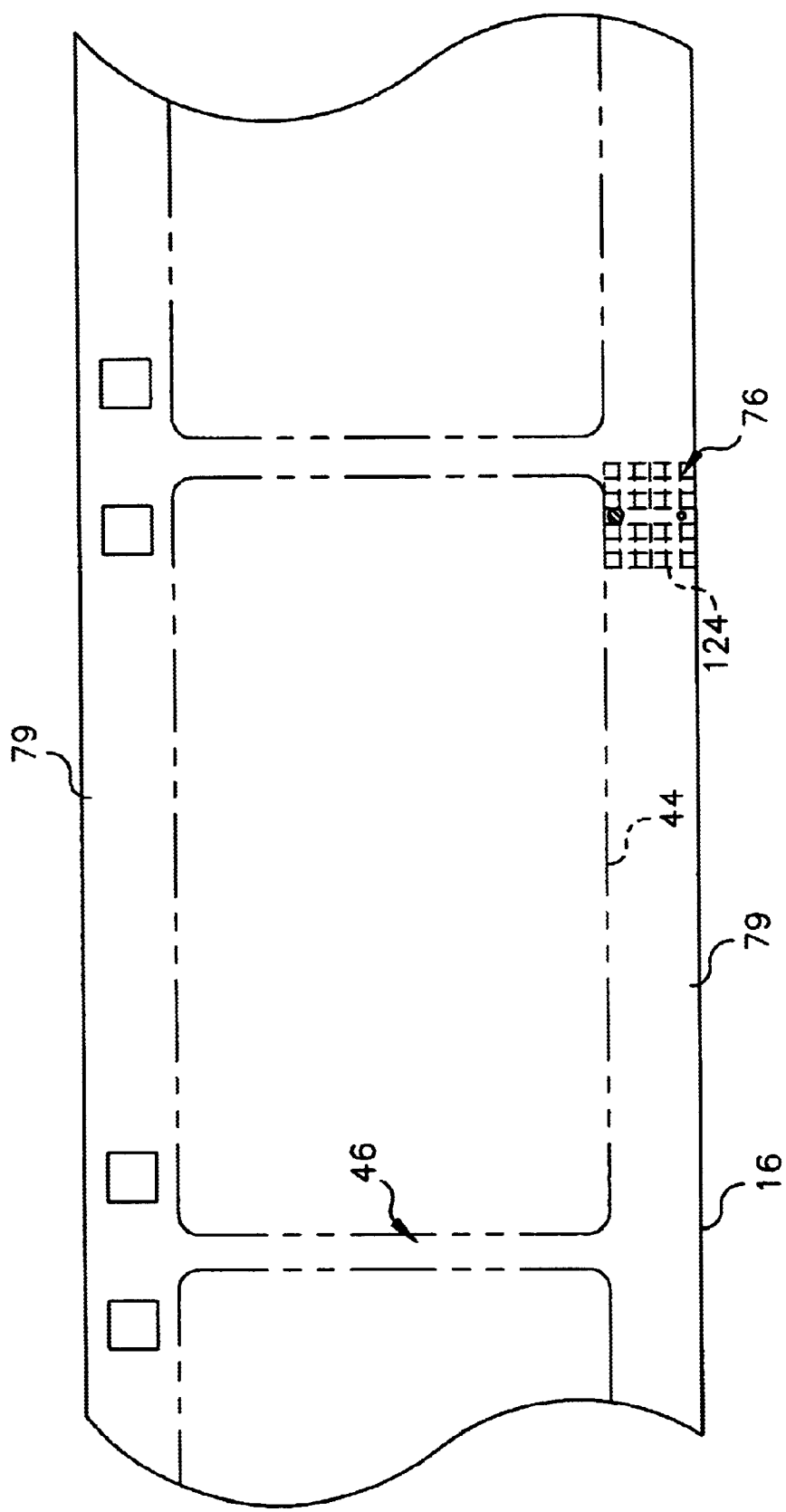
FIG. 12 is a semi diagrammatical view showing the filmstrip of FIG. 11 along with a mask pattern adjoining a film frame. The mask pattern is pixelated to indicate how the mask pattern is a read by a scanner.
Figure 13:
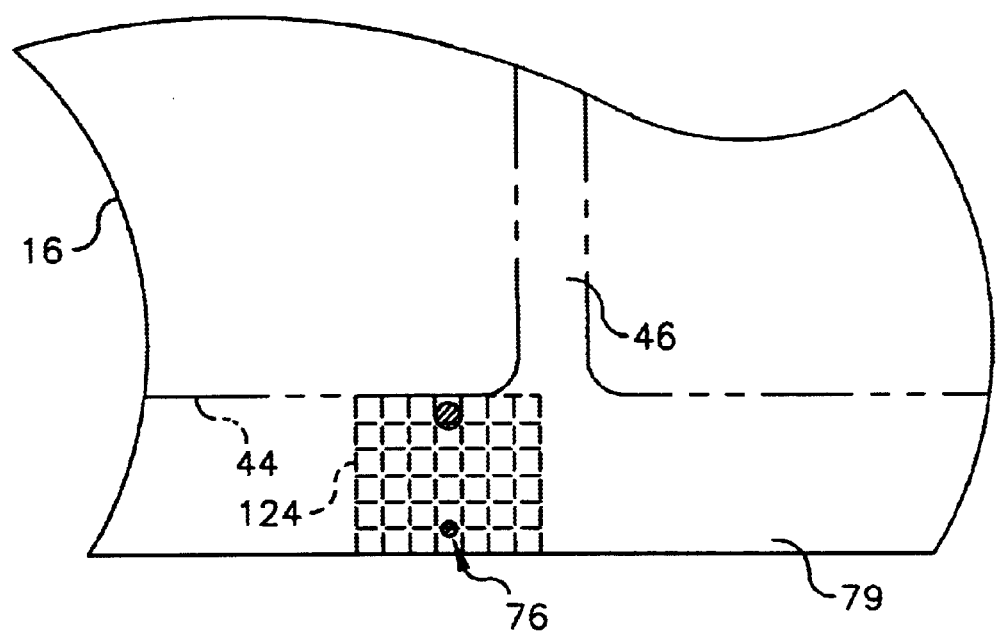
FIGS. 13–16 are partial enlargements of the view of FIG. 12 and show the mask patterns corresponding to different positions of the encoder.
Figure 14:
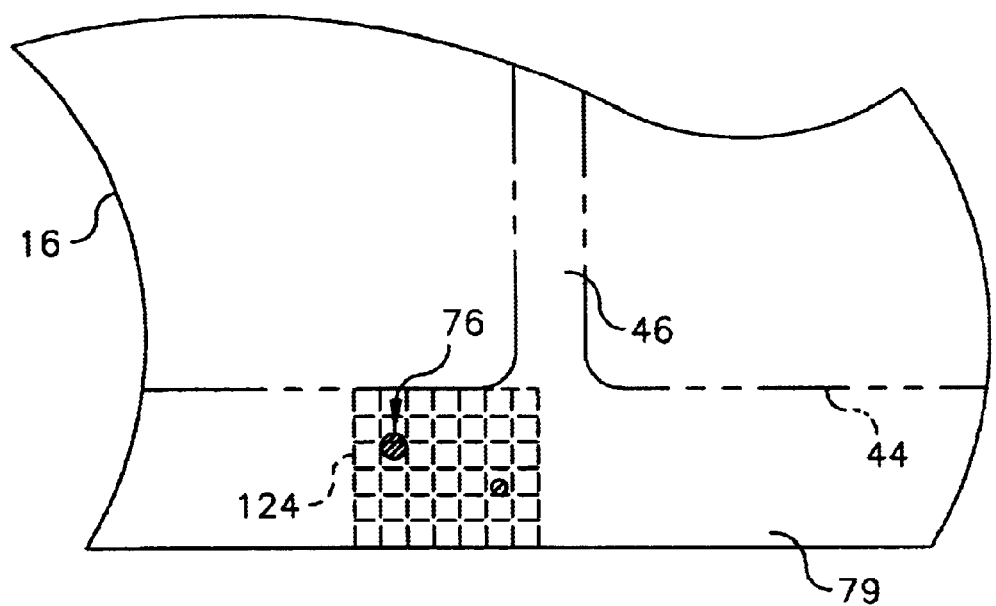
Figure 15:
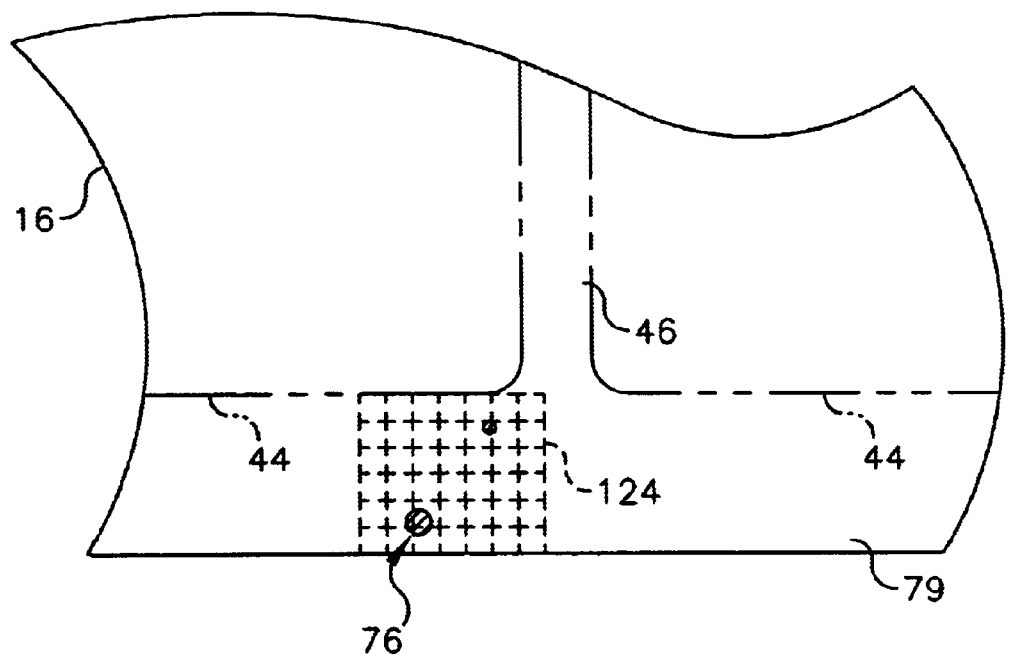
Figure 16:
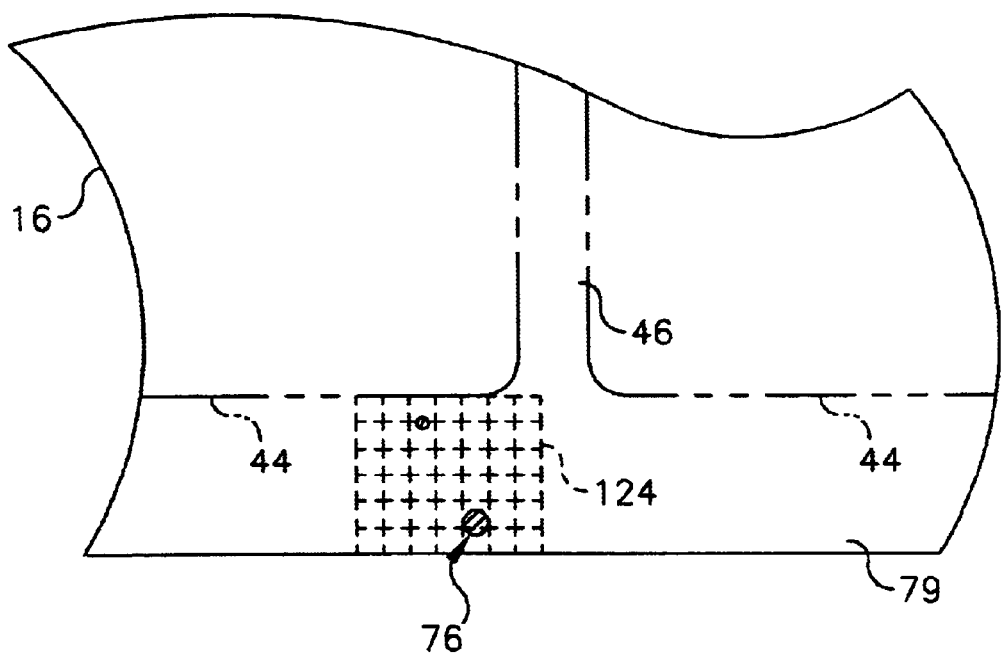

The encodement pattern 76 can overlap a respective film frame 44, but this degrades image content. It is preferred that the encodement pattern 76 be located on a margin 79 of the film 16 or in the interspace 46 between film frames 44. This is best seen in FIG. 11, which illustrates an encoder 68 positioned so as to place an encodement pattern 76 on a lower margin 79 of a filmstrip 16. A dashed circle 102 indicates the location of an alternative encoder 68 over the interspace 46 between film frames 44. This encoder 68 is smaller, as indicated by the dashed circle, but is otherwise like the other encoder 68 shown in FIG. 11.

The encoder 68 can be rotated to provide a set of encodement patterns 76 that differ in rotational position relative to the axis of rotation 78 of the encoder 68. Different encodement patterns 76 can be detected, following film development, during photofinishing. Each encodement pattern 76 can be associated with a different fulfillment option, such as numbers and types of prints or other final images, digital image modifications and the like. A user can change the encodement pattern 76 from frame to frame, as desired, within the set of available encodement patterns 76 of a particular encoder 68. The encodement pattern 76 associated with a particular film frame 44 can indicate a fulfillment option for that particular film frame or can indicate an option for a group of film frames or the entire film unit. In the latter case, an encodement pattern 76 can be exposed onto the film only when an option was changed or only once per film unit. Encoders 68 in different cameras 10 can also differ. This difference can be used to convey information, such as camera type or which set of multiple sets of fulfillment options are to be provided at photofinishing.

The marker 84 has a pair of subunits 104 located on opposite sides of the axis of rotation 78 of the encoder 68. The relative separation of the subunits 104 is maximized if, as shown in the illustrated embodiments, the subunits 104 are diametrically opposed on either side of the axis of rotation 78. Increasing the relative separation of the subunits 104 increases the number of angular positions of the encode 68 that can be differentiated by a given scanner.

The marker 84 is rotationally asymmetrical relative to the axis of rotation 78 of the encoder 68 and the encodement pattern 76 retains the asymmetry. In other words, the two subunits 104 have different configurations and/or colors. This allows the relative locations of each subunit 104 to be differentiated in the encodement pattern 76. As a result, encoder 68 positions at 180 degrees separation can be differentiated from each other. The use of differently configured subunits 104, in effect, doubles the overall size of the pattern.

A wide variety of different configurations can be chosen for the different subunits 104, with the limitation, that scanning during photofinishing will result in pixelation of the encoder image. Differences in the subunits 104 that are lost as a result of pixelation are not useful.

Figure 6A:
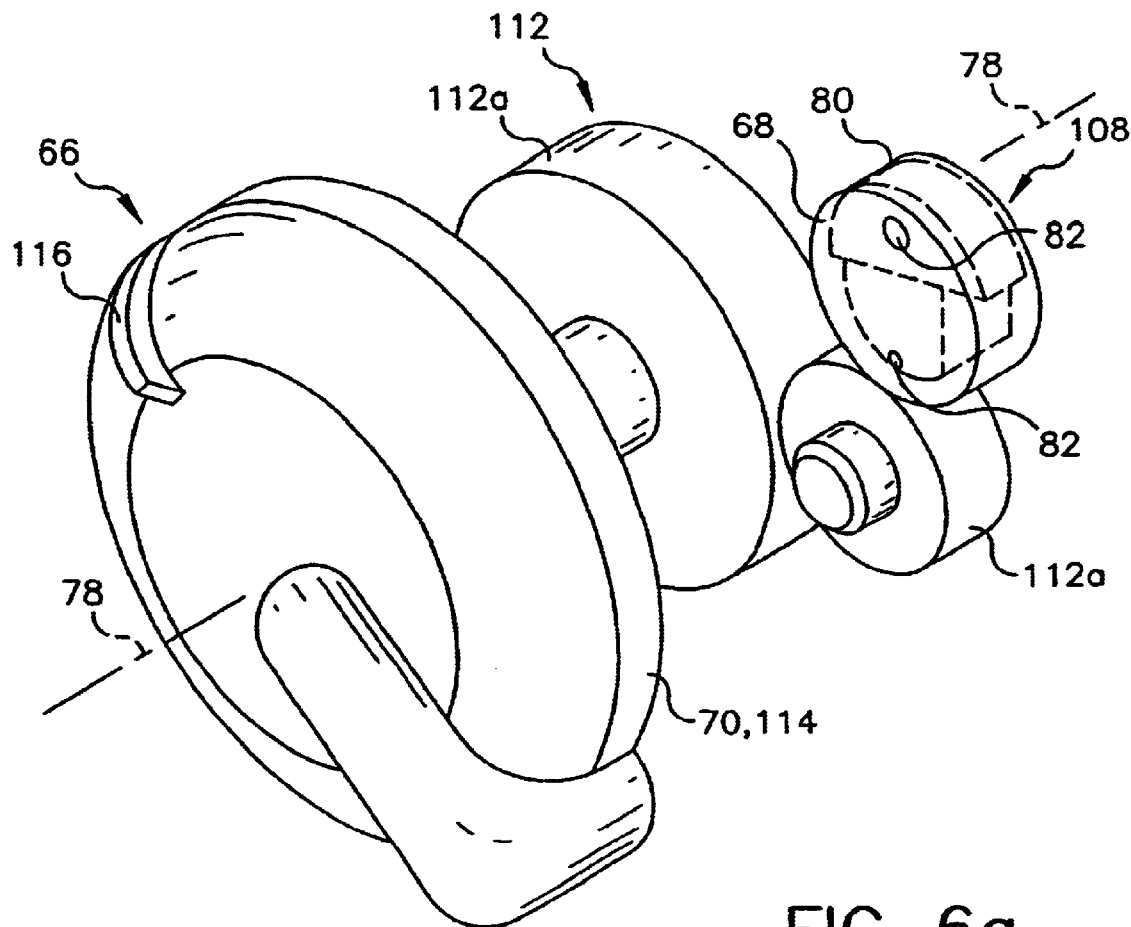
FIG. 6a is a perspective view of the encoder assembly of the camera of FIG. 1.
Figure 6B:
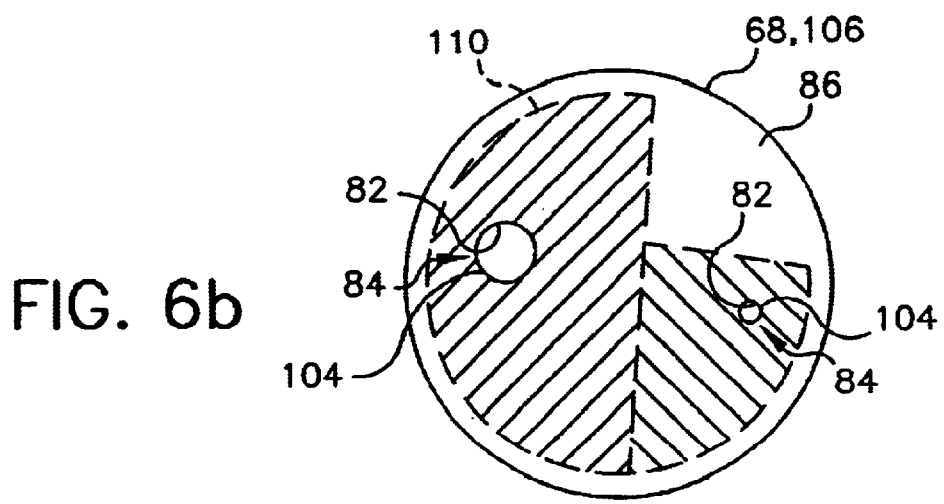
FIG. 6b is a rear view of the encoder of the camera of FIG. 1.
Figure 7:
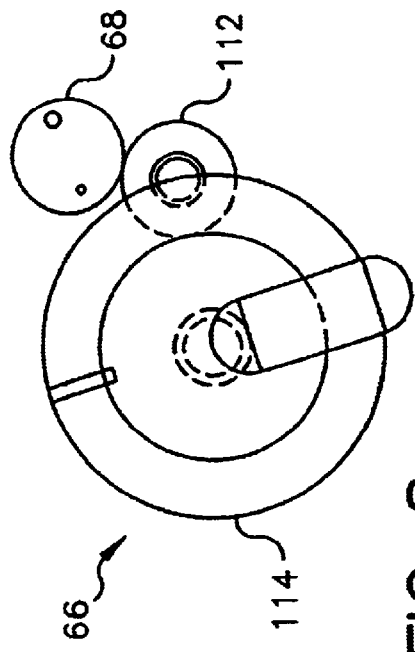
FIG. 7 is an axial view of the encoder assembly of FIG. 6 showing the encoder of the encoder assembly in a first rotational position.
Figure 8:
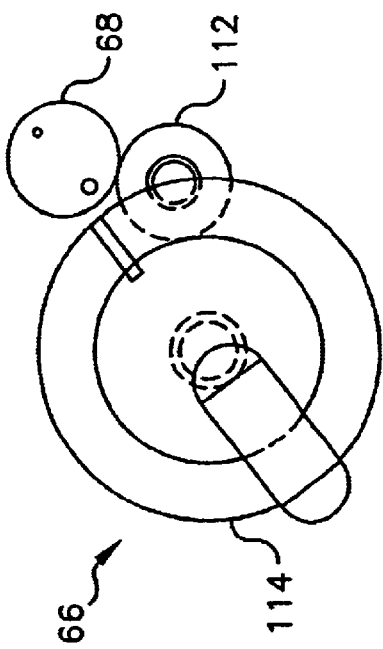
FIGS. 8–10 are the same view as FIG. 7, but the encoder is shown in three other axial positions.
Figure 9:
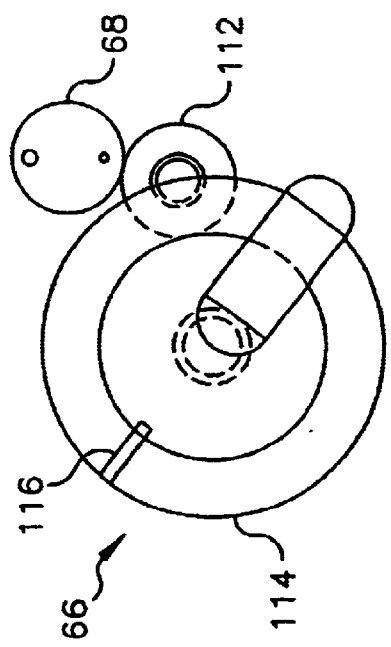
Figure 10:
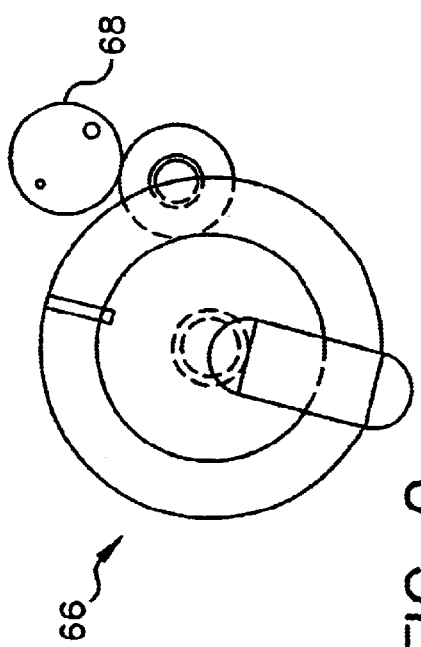

The differences between the two subunits 104 can be provided by making them different colors or different geometric configurations or both. A simple example of an encoder 68 having a two colored marker 84 is shown in FIGS. 6a–6b. The encoder 68 has a base part 106 that is opaque and has a cavity 108 that is shaped like a circular cylinder reduced by an assymetically positioned protrusion at one side. A filter part 110 has regions of two different colors (indicated in FIG. 6b by dashed line cross-hatching). The filter part 110 is shaped like the cavity 108, and is immobilized in the cavity 108 by use of adhesive or press-fitting or the like. The subunits 104 of the marker 84 are each formed by a hole in the base part 106 and underlying regions of the filter part 110.

In particular embodiments, the marker 84 has a plurality of spaced apart subunits 104 and the field 86 surrounds each of the subunits 104. The field 86 in this and other embodiments can be a contrasting filter, but it is preferable that the field blocks light. This provides for an encoder image on the film 16, in which a plurality of light areas produced by the marker 84 are each surrounded by a dark area produced by the light-blocking field 86. This helps by providing increased contrast, particularly if ambient lighting is used to provide illumination for the encoder 68.

In particular embodiments of the invention one of the two subunits 104 is smaller than the other in units of pixels (indicated by a grid 124 in FIGS. 12–16) of a scanner 126 to be used in expected photofinishing. At a minimum, the smaller of the two subunits 104 is larger than the gap between pixels of a scanner that will be used in the expected photofinishing, but small enough to fit on a single pixel and the larger subunit 104 is too large to fit on less than two pixels.

Figure 24A:
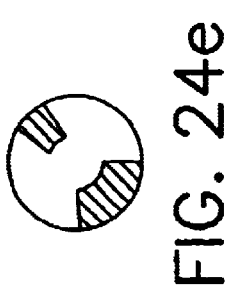
FIGS. 24a–24o are examples of different encodement patterns.
Figure 24B:
Figure 24C:
Figure 24D:
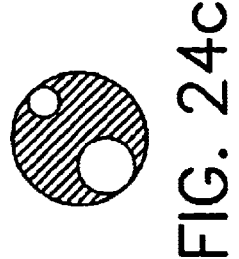
Figure 24E:
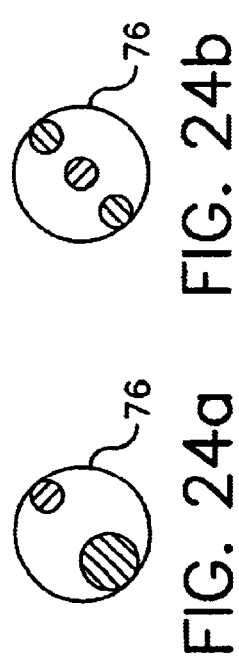
Figure 24F:
Figure 24G:
Figure 24H:
Figure 24I:
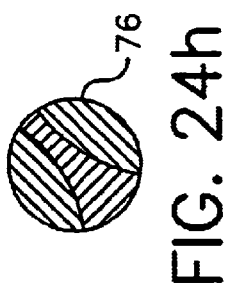
Figure 24J:
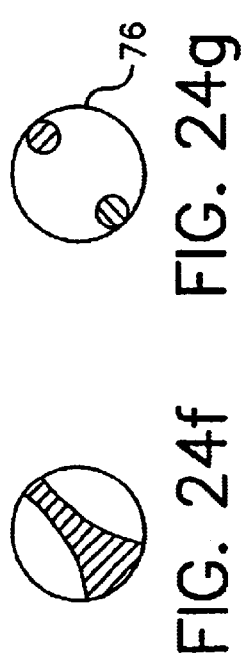
Figure 24K:
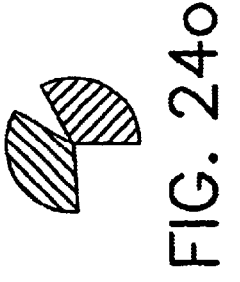
Figure 24L:
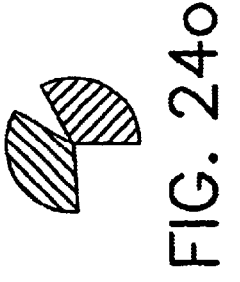
Figure 24M:
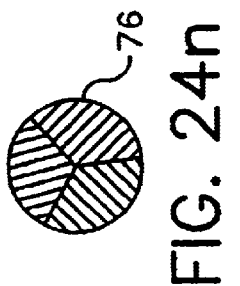
Figure 24N:
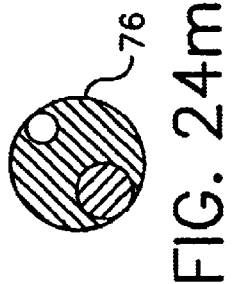
Figure 24O:
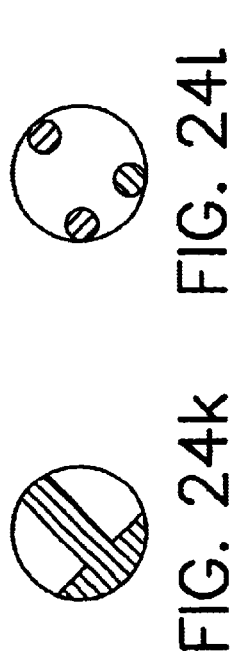

With larger sizes of subunits 104, specific geometric shapes of one or both subunits 104 can be used to distinguish the two subunits 104. For example, a number of encoders 86 having different shapes and colors of subunits 104 are shown in FIGS. 24*a*–24*o*. Different cross-hatch patterns indicate regions of different colors. Regions shown in black indicate white light exposure.

The encoder 68 is selectively movable by the user, between two or more different, predetermined positions. In an expected photofinishing unit 128, the encodement patterns 76 produced at the various positions are associated with particular digital modifications. A large number of different positions can be provided. The limitations here are the ability of the user to detect the placement of a knob 114 or other user control in the particular positions and the ability of the scanner system to detect the angle corresponding to the placement of the knob. The former can be readily resolved by mechanically by stepping up the distances between positions using gears or the like. Electronic controls can also be used to provide for more encoder positions than could easily be obtained manually. In any event, is it is very easy to provide eight or more positions. With currently available photofinishing scanners, 72 or more positions can be readily detected during scanning.

The encoder 68 is rotated between positions by an encoder drive 70. The drive 70 can be manually powered. In the embodiments shown in figures, the encoder 68 is rotated by a train 112. Members 112*a* of the train 112 are friction wheels or gears. One of the members 112*a* has a shaft 114 that is joined to an external knob 114 that is rotated by the user. The shaft 114 extends through a hole in the camera-frame 22 and a washer 118, and then through the rear cover 20 to the knob 114. In this case, the encoder 68 and train 112 are located between the exposure support 28 and the front cover 18. The encoder 68 and train members 112*a* are held by a support features of the camera-frame 22. The knob 114 includes a pointer 116 that indicates the selected position. Indicia 117 can be provided on the camera body 12 to indicate the digital effects associated with particular positions. In the illustrated embodiment, the knob 114 and a member 112*a* of the train 112 overlap to provide light locking. The light locking can likewise be provided in other manners.

Figure 18A:
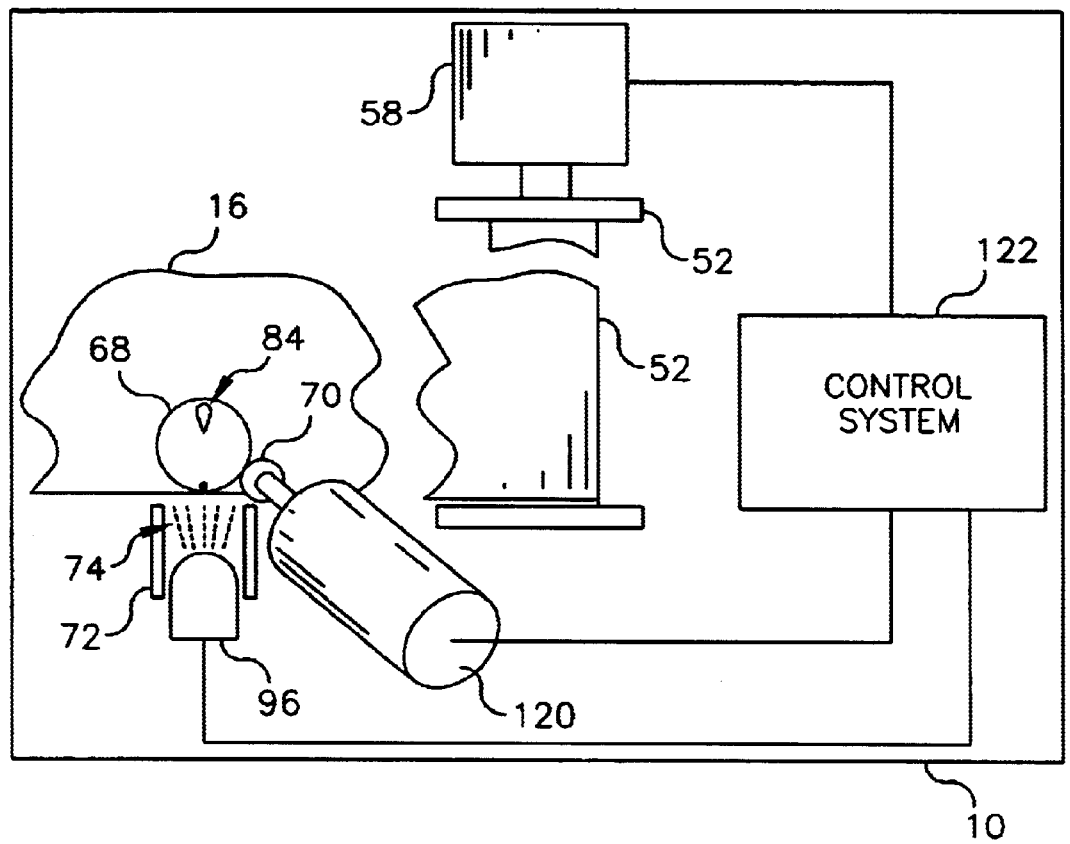
FIG. 18a is a semi-diagrammatical view of the encoder assembly and related camera features of another embodiment of the camera.

Referring to FIG. 18*a*, the encoder drive 70 can be powered by an electric motor 120. The user can operate the encoder drive 70 trough a switch or a user control connected to the motor 120 through a programmable computer 122 within the camera 10. Positioning of an electrically-driven encoder 68 can be provided in the same manner as in the positioning of zoom lenses. For example, a stepper motor can be used, or, alternatively, feedback can be used to indicate when a particular position is reached. A friction disk or gear coupled to the rotary encoder can have a code plate (not illustrated) or the like to provide the feedback.

Figure 18B:
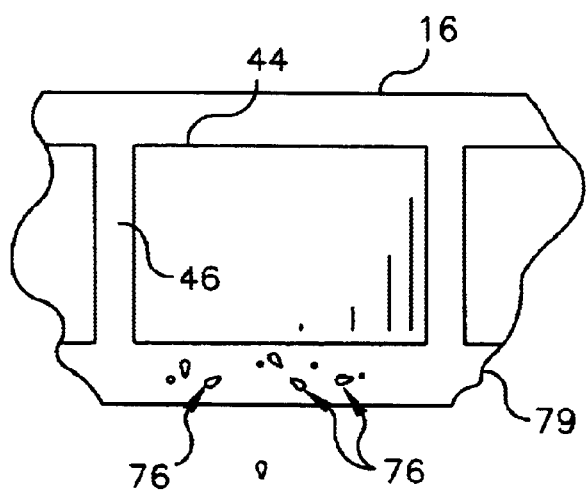

An electrically powered encoder drive 70 can be coordinated with an electrically powered film transport 58, by a control system 122 of the camera 10, such that multiple encoded signals can be recorded in margin 79 of filmstrip 16. Suitable control systems for camera operations, based upon programmable microprocessors and the like, are well known to those of skill in the art. A sequence of encodement patterns 76 can be exposed at each camera-frame 22, by coordinating film sport 58 and illumination of the lamp 96. For example, in FIGS. 18*a* and 18*b*, an encoder drive 70 moves an encoder 68 between eight different rotational positions to provide eight encodement patterns 76 corresponding to the base eight 0–7. The numbers correspond to compass positions, starting with north-zero, northeast-1, east-2, and continuing through the remainder of the sequence. FIG. 18*b* illustrates a set of encodement patterns 76, alongside a singe film frame 44, designating the base eight number 15736. This five digit number could represent the date the picture was taken.

The different codes provided by the encodement patterns 76 can be used to provide modifications at photofinishing. For example, modifications can be provided to change the number of prints to a selected number. An encodement pattern can provide a change in the image such as to black-and-white or sepia. An encodement pattern can also provide a change in print format. For example, a print can be changed from a normal format to pseudo-panoramic or pseudo-zoom. In this case, the camera can have a viewfinder mask 130 that is moved in tandem with the encoder 68. FIGS. 19–23 illustrate an example of such a viewfinder mask 130. The viewfinder mask 130 has two positions and rotates around the taking lens 24. The viewfinder mask 130 is driven by a mask gear train 132 that is mechanically coupled to the train 112 of the encoder unit 66. In the embodiment shown in FIG. 19, an axle 134 connects the two trains 132, 112. One gear or friction wheel 132*a* of the mask gear train 132 is external to the front cover 18 and directly engages the mask 130.

Figure 19:
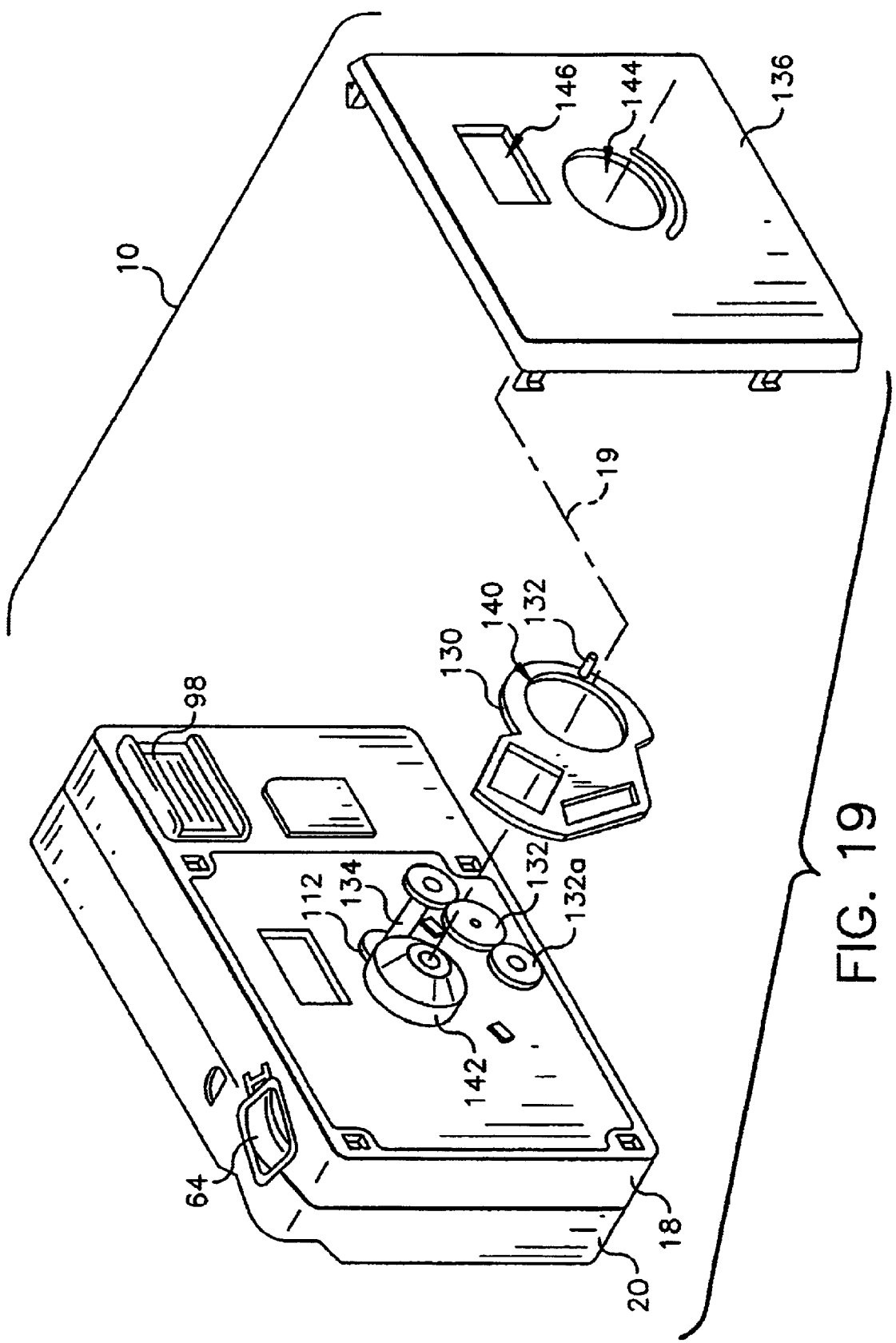
FIG. 19 is a partially exploded perspective view of another embodiment of the camera. Positions of a geartrain and connecting shaft are indicated by dashed lines.
Figure 20:
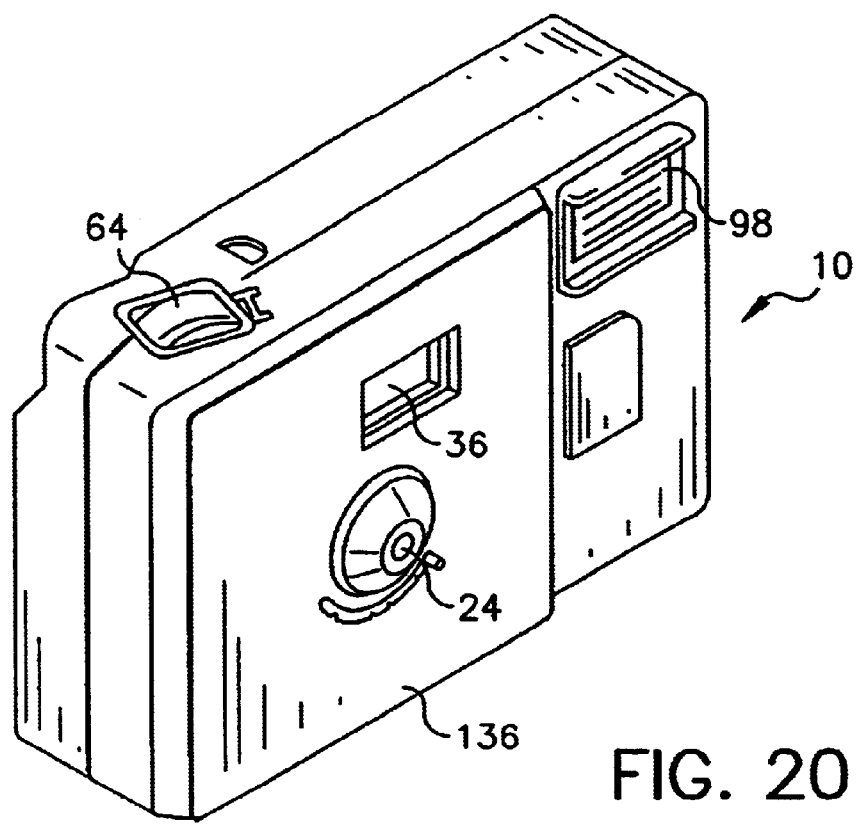
FIG. 20 is a front perspective view of the camera FIG. 19.
Figure 21:
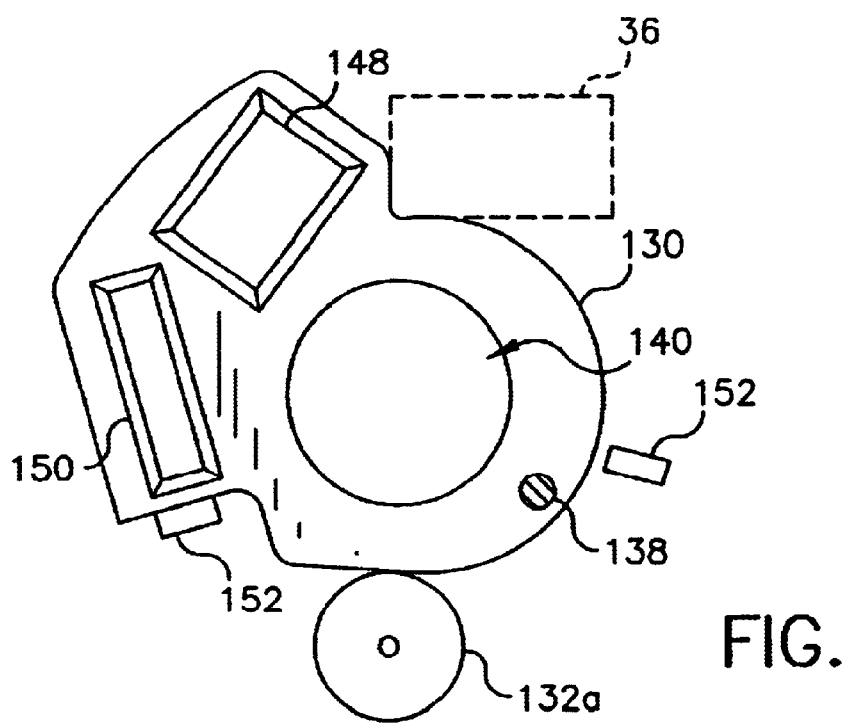
FIGS. 21–23 are front views of a viewfinder mask of the camera of FIG. 19 in orientations corresponding to three different positions of the encoder. Also shown are a gear of the geartrain, a pair of stops, and (in dashed lines) the location of the viewfinder lens unit.
Figure 22:
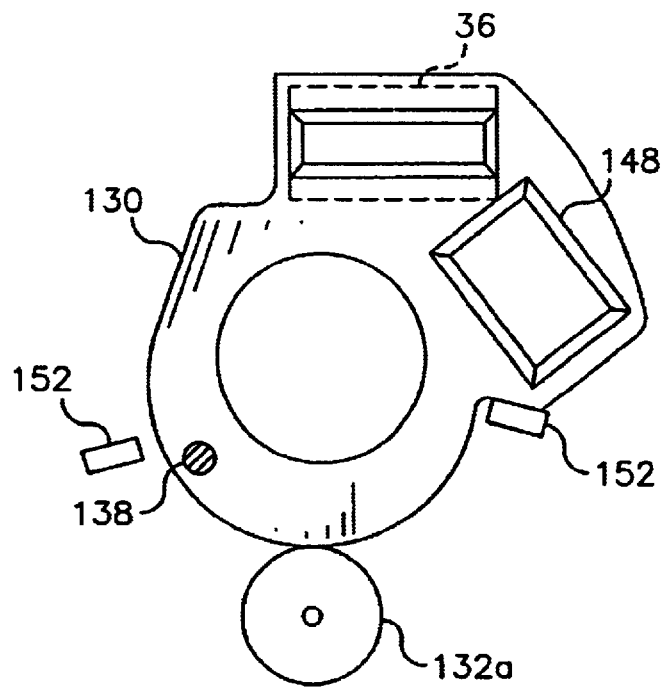
Figure 23:
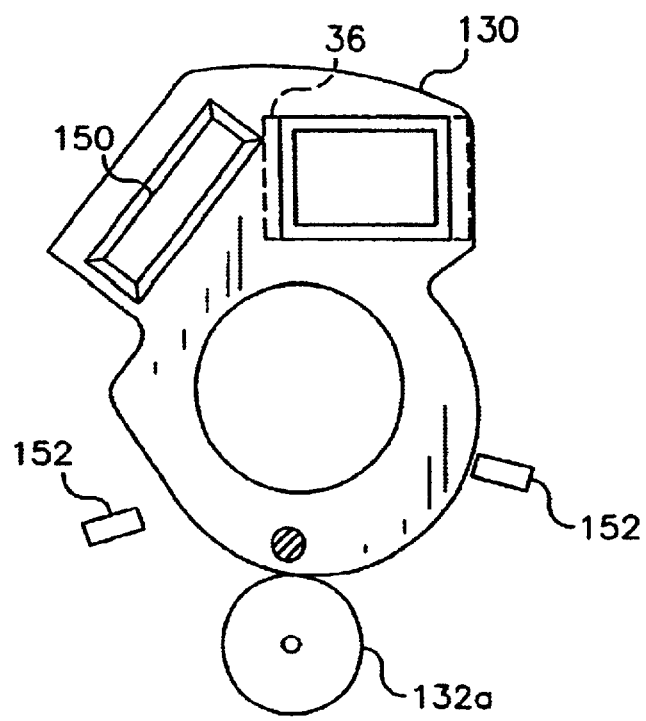

Detents can be provided to bias the mask and encoder. For example, an over-center mechanism (not shown) can be connected to the encoder unit, mask or one of the trains to bias toward specific positions and against intermediate positions. An alternative to an over-center mechanism is a series of positional detents for the mask settings. This is illustrated in FIGS. 19–20. In this case, a handle 138 of the mask 130 extends through a slot 135 in a forward panel 136. The slot 135 is arcuate and has teeth defining different positions of the mask 130. Internal biasing in the handle 138 discourages inadvertent movement of the handle 138 out of each of the mask positions defined by the teeth. The mask positions are coordinated with respective positions of the encoder so the user can see an indication of expected digital modification of captured images. Detents can also be provided on an encoder 68 that does not have a connected viewfinder mask 130.

In the embodiment of FIGS. 19–23, the mask has a large circular opening 140 that rotates against an extended cowl 142 that encircles the taking lens 24. The forward panel 136 has one opening 144 matched to the mask opening 140 and a second opening 146 matched to the viewfinder 36. The viewfinder 36 and forward panel opening 146 show an "HDTV" print format viewfinder image. The mask 130 has two masking windows 148,150, which mask the viewfinder down to normal ration 3:2 and pseudo-panoramic print formats, respectively. (These formats match those available in some Advanced Photo System™ cameras.) The mask 130 is rotated between the three positions. Stops 152 prevent overtravel of the mask 130.

The camera is generally described herein in relation to simplified embodiments. Similar considerations apply to other embodiments. For example, the camera can include a real image viewfinder rather than providing masks to show particular effects. The camera can also include a digital display and/or digital viewfinder that he can show particular effects. The encodement patterns have been described in relation to individual film frames. Encodement patterns can record information pertaining to an entire film unit, such as an identification number and user information. Encodement patterns can also be positioned independent of film frames, for example, on a leader or trailer of a film unit.

Figure 17:
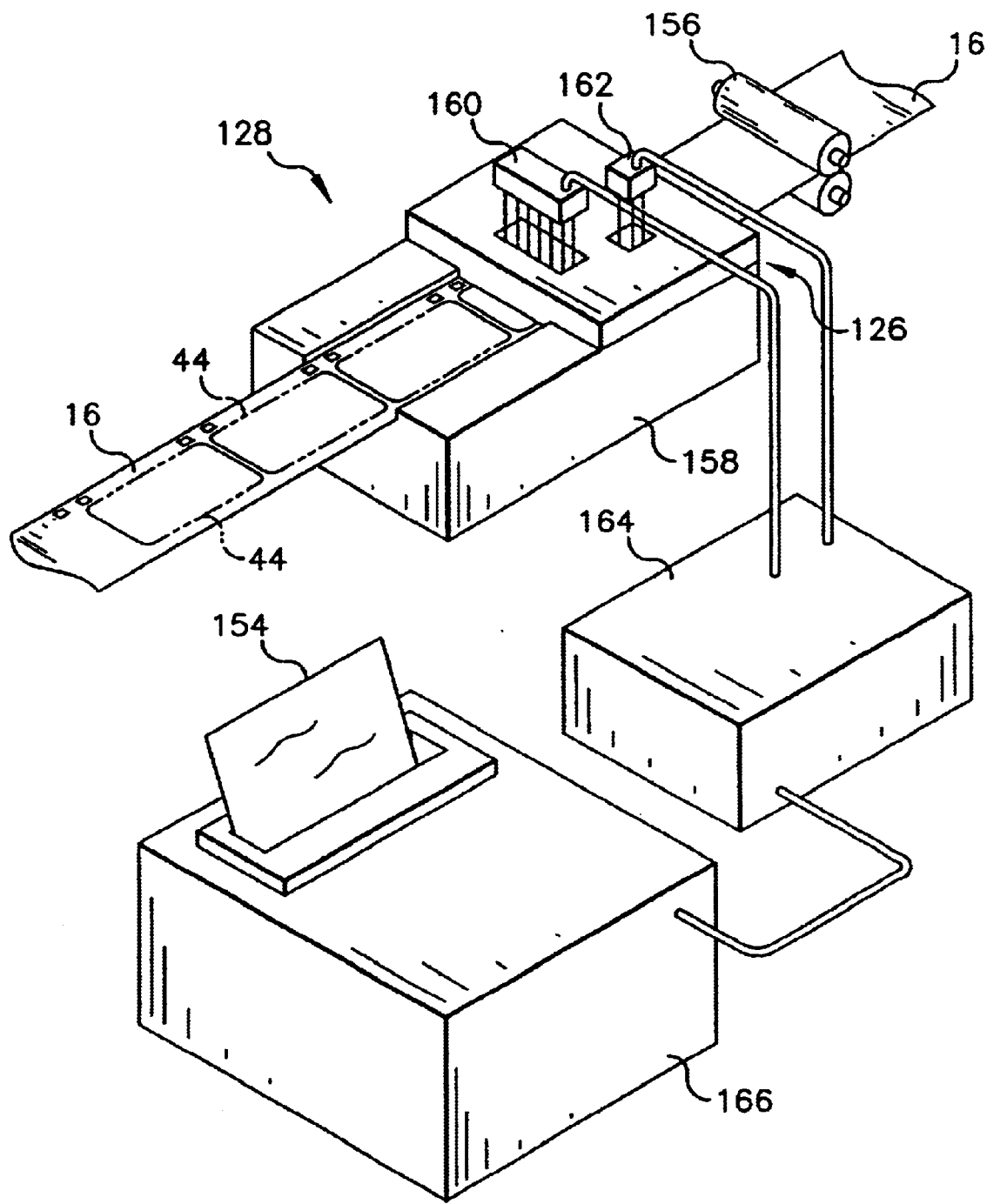
FIG. 17 is a semi-diagrammatical perspective view of an embodiment of the photofinishing unit.

FIG. 17 schematically depicts a photofinishing unit 128 that makes prints 154 or other final images from archival images recorded in successive film frames 44 of a filmstrip 16. Non-depicted is a chemical processor that is used to develop the latent images on the filmstrip. The photofinishing unit 128 can be like that disclosed in U.S. Pat. No. 5,767,945, issued Jun. 16, 1998. A motorized film drive 156 advances the filmstrip 16 from a film supply reel (not shown), through a digital scanner 126 and onto a film take-up reel (not shown). Filmstrips from many film units can be spliced together into a continuous web on the film supply reel. The scanner 156 has an illuminator 158 that directs light through the film frame 44 to an image scanner head 160 and through the encodement pattern (not shown in FIG. 17) to an encodement scanner head 162. The illuminator 158 shines light through each film frame and encodement pattern when the film frame is momentarily positioned at the scanner. The scanner heads 160,162 each have an image sensor such as a charge coupled device (CCD). The resultant analog electronic image provided by the image sensor is converted into digital form and amplified as necessary by an analog to digital ("A/D") converter (not shown) and sent to a control unit 164.

The control unit 164 is a programmable computer or the like, which provides conventional digital image processing of the electronic images. The control unit 164 checks the detected encodement patterns against a predetermined list of encodement patterns and corresponding digital modifications using a look-up table or the like stored locally or remotely in memory. Respective digital modification are applied to the electronic images and the resulting modified images is output to an output device, such as a printer 166.

The control unit can be part of a general-purpose computer system or can be a dedicated part of photofinishing equipment. In the latter case, the central processing unit can be part of a control system sometimes referred to as an image data manager (IDM). The computer system or IDM includes memory and can include a display and user controls allowing for supervision and intervention by an operator.

The camera 10 is generally described herein in relation to simplified embodiments. Similar considerations apply to other embodiments. For example, the camera 10 can include a real image viewfinder 36 rather than providing masks to show particular effects. The camera 10 can also include a digital display and/or digital viewfinder that he can show particular effects. The encodement patterns 76 have been described in relation to individual film frames 44. Encodement patterns 76 can record information pertaining to an entire film unit 52, such as an identification number and user information. Encodement patterns 76 can also be positioned independent of film frames 44, for example, on a leader or trailer of a film unit 52.

The invention has been described in detail with particular reference to certain preferred embodiments thereof, but it will be understood that variations and modifications can be effected within the spirit and scope of the invention.

What is claimed is:

1. A camera for use with photographic film, said camera comprising:
    a body having an exposure support surrounding an exposure opening, said body defining a encoder light path;
    an encoder mounted in said body in alignment with said encoder light path, said encoder having an axis of rotation, said encoder having a marker occupying part of said encoder light path, said marker having a pair of subunits, said subunits being opposed relative to said axis of rotation;
    a drive coupled to said encoder, said drive selectively rotating said encoder about said axis of rotation between a primary position and a plurality of secondary positions, said subunits both being disposed in said encoder light path in all of said positions.

2. The camera of claim 1 wherein said subunits are diametrically opposed relative to said axis of rotation.

3. The camera of claim 1 wherein said subunits are spaced from and diametrically opposed relative to said axis of rotation.

4. The camera of claim 2 wherein said marker is rotationally asymmetric relative to said axis of rotation.

5. The camera of claim 4 wherein said encoder has a field adjoining said marker, said field being light-blocking, and said marker is at least partially light transmissive.

6. The camera of claim 5 wherein said field surrounds said marker.

7. The camera of claim 5 wherein said subunits are spaced apart, and said field surrounds each of said subunits.

8. The camera of claim 1 wherein each of said subunits is differently colored.

9. The camera of claim 8 further comprising a white light emitting diode disposed in said encoder light path opposite said encoder.

10. The camera of claim 8 wherein each of said subunits has a different geometric configuration.

11. The camera of claim 1 wherein each of said subunits has a different geometric configuration.

12. The camera of claim 1 further comprising a taking lens directing light to said exposure support, and wherein said encoder is disposed between said taking lens and said exposure support.

13. The camera of claim 1 wherein said encoder adjoins said exposure support lateral to said exposure opening.

14. The camera of claim 1 wherein said encoder is rotatable between said primary position and at least seven secondary positions.

15. The camera of claim 1 wherein said film has a plurality of frames, and said camera further comprising a film transport moving said film frame-by-frame past said exposure support, a lamp disposed at an end of said encoder light path, and a controller actuating said lamp multiple times per frame, during said moving of said film.

16. The camera of claim 15 wherein said drive includes a motor actuated by said controller.

17. A camera comprising:
    a body having a film holder having an exposure support, said exposure support having an edge surrounding an exposure opening, said body having an encoder light path intercepting said edge;
    an encoder disposed in said edge, said encoder having an axis of rotation, said encoder having marker and a field, said marker being at least partially light transmissive, said marker having a pair of subunits, said subunits being diametrically opposed and rotationally asymmetrical relative to the respective said axis of rotation, said subunits both being continuously disposed in said encoder light path, said field adjoining said marker;
    a drive disposed in said body, said drive selectively rotating said encoder about said axis of rotation, relative to said exposure support, into one of a plurality of different positions.

18. The camera of claim 17 wherein said marker is smaller than the width of said edge in a direction extending parallel to and outward from said exposure opening.

19. The camera of claim 18 wherein said encoder laterally adjoins said exposure opening.

20. A photography method comprising:
    transmitting a light image through an exposure opening to a frame of photographic film;

in association with said transmitting of said light image, rotating a encoder to a selected angular position relative to an axis of rotation of said encoder, said encoder having a marker that is rotationally asymmetrical relative to said axis of rotation;

transmitting light along an encoder light path, through said marker to said filmstrip following said rotating;

maintaining said marker in said encoder light path during said rotating and transmitting;

maintaining said encoder in said angular position during said transmitting though said marker.

21. The method of claim 20 wherein said light is transmitted through said encoder to an interspace immediately adjoining said film frame.

22. The method of claim 21 wherein said encoder has a light transmissive portion having a pair of differently configured subunits, said subunits being diametrically opposed relative to said axis of rotation.

23. A camera for use with photographic film, said camera comprising:

a body having an exposure support surrounding an exposure opening, said body defining an encoder light path;

an encoder mounted in said body in alignment with said encoder light path, said encoder being selectively rotatable about an axis of rotation extending through said encoder light path, said encoder having a marker and a field that differ in light transmission, said marker and said field both being continuously disposed in said encoder light path, said marker being asymmetric relative to said axis of rotation;

a drive coupled to said encoder, said drive selectively rotating said encoder about said axis of rotation between a primary position and a plurality of secondary positions.

24. The camera of claim 23 wherein said marker has a pair of subunits, said subunits being diametrically opposed.

* * * * *